April 14, 1970  I. H. BOTNICK ET AL  3,506,083
VEHICLE SAFETY SEAT BELT RIGGING

Filed Sept. 16, 1965

INVENTORS
IRLIN H. BOTNICK
PHILIP D. GOLRICK
BY LEWIS H. POLSTER

*Ely and Golrick*

ATTORNEYS

INVENTORS
IRLIN H. BOTNICK
PHILIP D. GOLRICK
BY LEWIS H. POLSTER

*Ely and Golrick*

ATTORNEYS

INVENTORS
IRLIN H. BOTNICK
PHILIP D. GOLRICK
LEWIS H. POLSTER
BY
*Ely and Golrick*
ATTORNEYS

United States Patent Office 3,506,083
Patented Apr. 14, 1970

3,506,083
VEHICLE SAFETY SEAT BELT RIGGING
Irlin H. Botnick, 3155 Kersdale Road, Pepper Pike, Ohio
44124; and Philip D. Golrick, Cleveland Heights, and
Lewis H. Polster, Cleveland, Ohio; said Golrick and
said Polster assignors to said Botnick
Filed Sept. 16, 1966, Ser. No. 580,111
Int. Cl. B60r 21/00; A62b 35/00
U.S. Cl. 180—82                                    30 Claims

ABSTRACT OF THE DISCLOSURE

A seat belt or harness type safety rigging, disclosed as semi-permanently rigged in, but displaceable for passenger to and from an automotive vehicle environment, with at least one end of a body-restraining strap reach terminating as a flexible element in a unit providing a reel for the flexible element, a normally released latching device for anchoring the reeled flexible element to prevent unreeling; a reel motor; and a latch actuator in the form of a solenoid or vacuum bellows responsive to an "ignition-on" or engine operating condition to engage the latch and anchor the strap reach end.

---

The present invention relates generally to vehicle-occupant restraining safety strap rigging; and more particularly to rigging for a safety belt or harness having one or more strap portion ends attached at one side of a seat position in the vehicle and at least one other portion attached in extensible manner at another side of such seat position, for example, to a door. Specifically the invention relates to such a rigging as may be left buckled or attached at all times while yet permitting entrance to and egress from the seat. Though the invention may be used in other environments, it will be hereinafter discussed as applied in modern automobiles in view of particular advantages therein.

Among the great variety of safety seat belt and harness rigging for vehicles known to the prior art there have appeared not only belt rigging with retracting reel units mounted in a door adjacent a seat position into which at least a portion of a non-used strap is drawn into the door when not in use, or from which the suitable lengths of belt may be drawn as required for the size of the user, but also systems wherein a belt may be left buckled and attached on one side of a seat position and to a door on the other, with the geometry or mechanism being such that the door may yet be opened with the belt moving forwardly out of the way of the user for convenient entry to or egress from the seat position. Also in the prior art is to be found the use of seat belt arrangements such that when the belt is in use, the door or doors of the vehicle adjacent to the seat positions in question have additional securement against flying open upon impact, for example, by the belt itself.

It is the general object of the present invention to provide an improved arrangement of such type wherein a strap may be left connected to a door and to a point or points within the vehicle, while yet allowing the user conveniently to enter and to leave the vehicle by virtue of a mechanism paying out and retracting a strap portion; and providing the further advantage and function of a latching mechanism activated, once the vehicle engine is started, so to secure the retractable strap portion effectively anchored both for its proper function as a safety device restraining the user and also to hold the door closed upon impact conditions.

Certain aspects of the invention can be used not only with the widely used transverse strap or belt, but also in a harness-type of rigging, wherein in addition to more or less horizontal transverse belting across the user, there is also included a so-called shoulder strap extending from the transverse straps to a vehicle ceiling region usually somewhat behind the seat position.

It is a further object of the invention to provide a unit relatively simple in construction and installation, comprised of a take-up reel for one belt or strap portion and also a strap latching device which, once made operative into a latched condition, will remain so despite stalling of the engine whether under normal conditions or under emergency or collision conditions; but which is yet readily releasable through simple controls.

These objects are preferably obtained by providing, for example, in the case of a two-piece type belt, the anchoring of one part at one side of a seat position and the anchoring of the other in a reel unit having a suitable spring-type or actively powered belt retraction motor, and also including a suitable latch engageable with a portion of the belt; whereby the belt may be reeled out or released as the door is swung open, but automatically retracted when the door is closed, with latching automatically following upon starting of the motor.

Generally speaking it is most convenient to locate such units near the rear free edge of modern front-hinged automobile doors, in the case of front seats, for example, at a place the unit may serve as an arm rest. The latching is achieved either electrically or, in a preferred form of the invention, by a vacuum actuated cylinder or in combination with suitable control valve means maintaining the latched condition despite any stalling of the vehicle engine in ordinary operation or under collision conditions.

Other objects and advantages of the present invention will appear from the following description and the drawings wherein.

The embodiment shown in FIG. 1 has a separate belt rigging for each of a pair of adjacent seat positions shown as the front seat ST of an automobile; each being similar in construction and controls as hereinafter described. Considering one of these belt arrangements, each is comprised of one so-called fixed strap 11 conventionally anchored at its inner end at 12 beneath and behind the seat structure, and preferably having a length adjusting connection at buckle device 13 whereby it is connected to a second extensible strap or belt portion 14; the other outer end of the latter passing through a slot of a reel and latching unit 15 mounted on the inside door panel. In some cases the unit may be mounted within the door space where the selected position clears the glass retraction path and internal door mechanism. The unit 15 is shown in FIG. 2 and more fully described hereinafter.

It will be noted that, in the modern front-hinged automobile door arrangement shown and having the unit 15 disposed on, and towards the rear edge of, the door at an appropriate height relative to the horizontal surface of the seat position, as the door swings open and the belt is drawn off the reel mechanism out of the unit 15, the belt is swung forwardly, thereby permitting the passenger or driver to enter or leave the seat position protected by the belt without unbuckling the belt. With suitable fixed end anchoring, the unit 15 may be located at a higher position for a "chest belt" arrangement.

Figure 4:
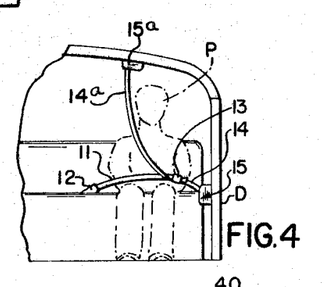
FIG. 4 is a generalized representation of the invention as associated with a harness-type safety rigging.

Further where it is desired to use a harness-type rigging, as shown schematically in FIG. 4, a second reel and latching unit 15A may be mounted in the roof or top portion of the vehicle above and to the rear of the seat space thereby served, to provide an extensible and retractable shoulder or body strap 14A extending down across the user P to an appropriate connection with the transverse belt, the lower end of 14A being here shown connected to the transverse belt portion 11. With this arrangement, wherein the extensible strap 14A is provided for user convenience rather than merely a fixed length strap, so much length need not be reeled in and out of the top unit 15A as would be required for a transverse belt in the door unit 15. Consequently, the unit 15A may be designed with a smaller capacity reel, being otherwise identical with the door unit.

Figure 5:
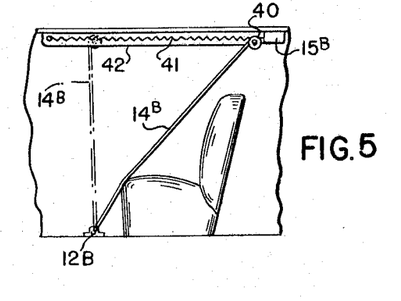
FIG. 5 is a generalized representation of the invention in a shoulder strap arrangement.

In FIG. 5, a single strap, so-called "shoulder-strap" installation, independent of door or lateral structure appears, with a unit 15B as in FIG. 5 ceiling mounted above and behind the seat position. The single strap may, however, in effect be longitudinally divided, between points (in the solid line strap representation of FIG. 5) at about the seat front edge and just below pulley 40 respectively, to pass over both shoulders of the user. The extensible-retractable strap passes over a shiftable pulley 40 down over the user to an anchor device at 12B, e.g., "between-the-feet location," where the lower end may be attached through a length adjusting fitting, as shown in solid lines for the retracted and locked condition; but with the unit unlocked for convenience of the user in entering or leaving the seat, it is displaced to the dotted position as effected by a contracting spring 41 pulling the pulley 40 forward along ceiling-mounted track 42, in an arrangement similar to that of FIG. 10 for a door unit.

Figures 9, 11:
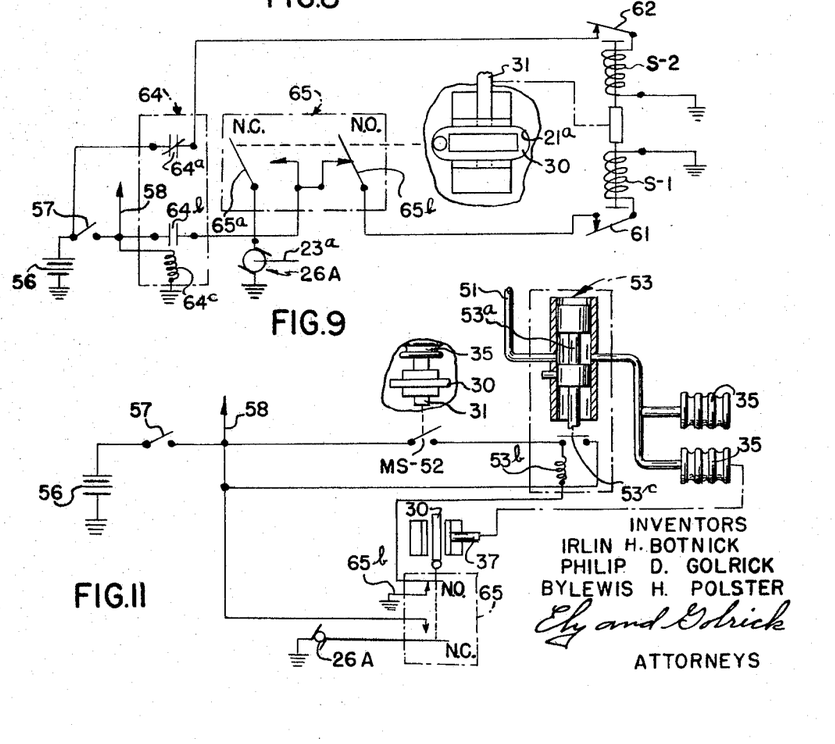
FIG. 9 is a schematic diagram of a second unit modification, all-electrical in its controls and energization.
FIG. 11 is a schematic diagram of a vacuum-lock, electric-driven reel unit.
Figure 10:
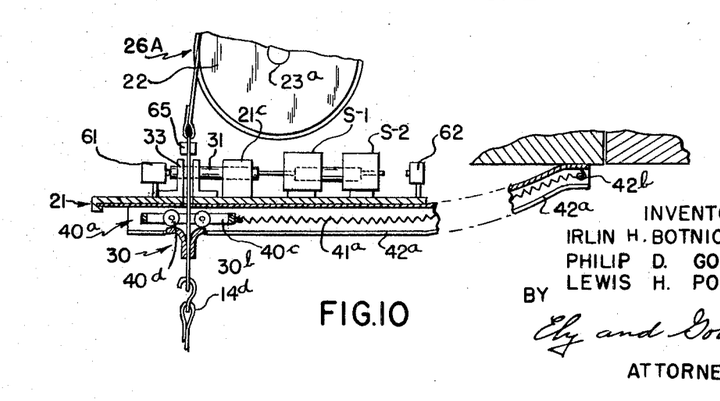
FIG. 10 is a fragmentary sectional view indicating structure for FIG. 9 as well as a further modification.

In this displacement, though the length between 12B and 40 shortens, a total strap length between 12B, 40 and 15B increases so that the strap pays off the reel in 15B. For this installation if it is desired that the forward shift be automatic upon unlocking for unit 15, the electric motor reeled units represented by FIGS. 9 or 10 are useful; but if manual forward displacement of strap 14B is desired the spring reel retracted units of FIGS. 2–8 are suitable, spring 41 being weaker than the reel spring. In these several strap arrangements, there is provided under operating conditions a strap reach disposed across and restraining the body of the person in the seat, with opposite ends of the strap reach anchored to the vehicle, at least one reach terminating in a portion flexible enough to form an element reelable on a reel such as provided in unit 15.

The unit 15 comprises a heavy plate 21, as a base for other components, adapted, for example, by brackets 21b to be securely mounted on a door inside panel, e.g., also adapted to serve as an arm rest, or where circumstances of vehicle construction and desired placement permit, within the door-enclosed or on or within vehicle ceiling space by any suitable means. Where a door interior mounting, or a concealed back seat mounting, is used, plate 21 may lie immediately underneath the inside decorative door panel or back seat interior facing, or if suitably styled the base plate may be embodied in and as a part of the door facing or panel.

The belt portion 14 passes through base plate slot 21a onto a reel or spool 22 to which its inner end is anchored, rotatably supported on a shaft 23 with axis parallel to slot 21a and connected to a suitable motor 26, here a Neg'ator type constant torque or constant tension spring motor. This motor is comprised of a pair of spring reels 24, 25 between which the spring 27 winds back and forth, and mounted as a motor assembly on base 21 with the belt reel 22 in effect connected directly to the spring reel 24. The orientation of the spring or its winding is, of course, appropriate in direction so that as the belt portion 14 is pulled out of the slot the spring is wound up storing energy whereby the belt portion 14 tends to be returned, re-reeled or retracted, onto the reel as tension on its outer end is released.

At an appropriate location in the length of belt or strap 14, there is inserted a latch plate 30 having a short length 30a to opposite slotted end of which the belt portions are secured and which may enter the slot 21a and receive a locking bolt therethrough as hereinafter described, and also further having flanged portions 30b serving as a stop means to limit the in-reeling of the belt and also to locate the latch plate at a definite latchable position when it encounters the base.

In the unit 15, a normaly retracted sliding latch bolt 31 is suitably supported and guided on slideway or guide means for engagement with the latch plate 30, the guide structure including (see also FIG. 3) in addition to channel formation 21c on the base also on each side of the slot 21a the apertured rugged brackets or plates 32 and 33 between which stops latch plate 30 with its aperture in alignment with the corresponding fixed plate apertures for engagement by the latch bolt 31. Preferably a normally-open micro-switch MS52 is mounted adjacent plate 33 with actuator element disposed in alignment with the path of bolt 31, so that when the latter is in locking position, it sets the switch to non-normal or closed condition.

The latch actuating means in FIG. 2 includes a small vacuum actuated servo type air bellows 35 having one end fixed on the plate 32, for example, above the slide bolt, and free end connected to a suitable right angle slide leg 31a whereby upon vacuum application the bellows is contracted thereby advancing the bolt 31 into latching position beyond plate 32 through plate 30 and 33.

The latch could, of course, be operated by other means such as, for example, the pair of solenoids S–1, S–2 as shown in the modification of FIG. 9.

Figure 6:
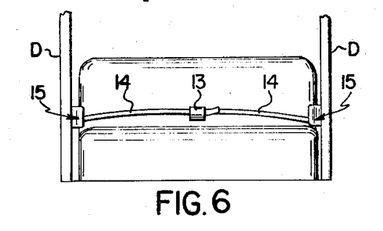
FIG. 6 is a schematic, generalized showing of the use of paired units for one belt spanning the entire distance between opposite vehicle doors.

In FIG. 6 a single seat belt is shown spanning the entire width of the vehicle, in which case preferably one unit 15 or 15' is located on or in each door D and D' the strap portions 14 and 14', of which are joined by appropriate buckle or connecting means 13 at which an appropriate length adjustment is also preferably provided; where a single belt arrangement is desired, this form being used in preference to the alternate possibility of having a single unit 15 in one door, with an appropriate anchoring receptacle for the free end of its strap 14 whereby it may be connected to the opposite door, or merely having one end of a belt portion 11 anchored in the opposite door, in view of the probability that both doors will frequently be simultaneously opened, which would in the case of use of a single unit 15 require a much larger reel to accommodate a sufficient length of strap or belting to be paid out under these circumstances. By use of the two units a portion of the total extensible strap length required will come out of each unit 15 whereby the units may be kept at convenient size, in contrast with a large reel as would be required in the case of use of a single unit for such purposes.

Figure 1:
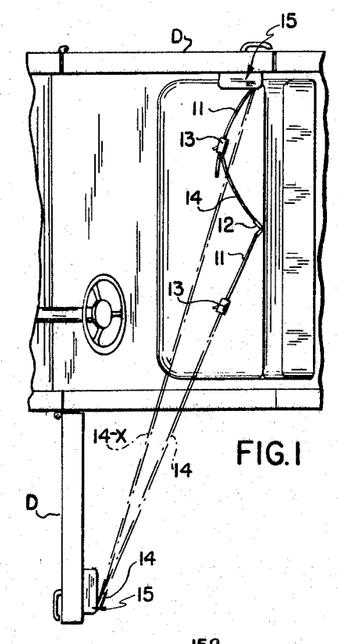
FIG. 1 is a transverse section of a vehicle above the seat level showing in horizontal plan, the rigging for a normal seat belt, or the transverse portion of a harness arrangement.
Figure 2:
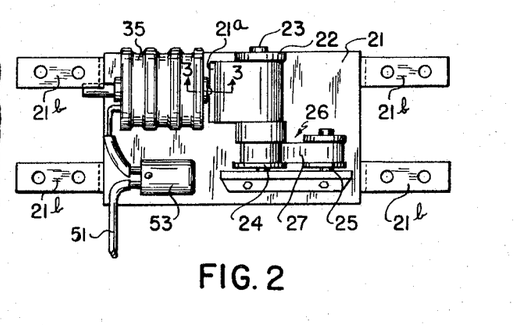
FIG. 2 shows in vertical elevation a reel and latching unit representing one form of the present invention.
Figure 3:
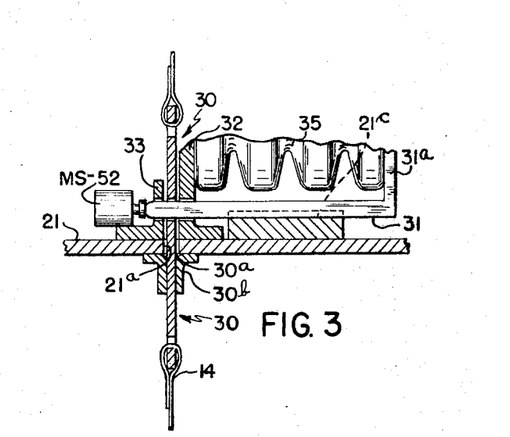
FIG. 3 is a sectional detail view taken about as indicated by the line 3—3 in FIG. 2, showing a form of cooperating sliding latch bolt and latch plate and stop on the belt.

A typical displaced position for the strap with one door open is also represented by the dashed line 14–X in FIG. 1, for purposes of comparison with the double unit installation of FIG. 6.

Figure 7:
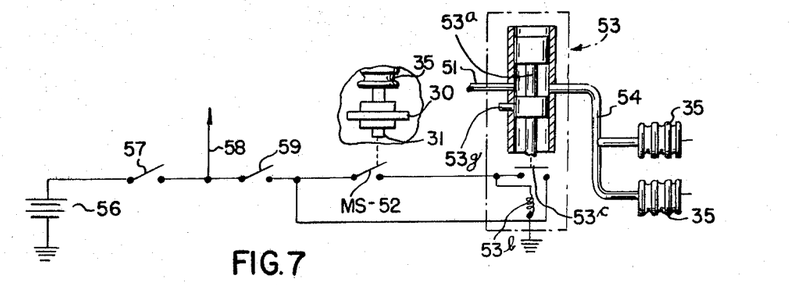
FIG. 7 is a schematic representation of the electrical control and vacuum control units usable with FIG. 2.

Controls for one or more of devices 15 are shown schematically in FIG. 7, comprising a vacuum line 51 to the intake manifold of the engine (which is therefore under a vacuum when the engine is operating) connected to the valving portion 53a of the three-way solenoidally controlled valve 53, the control port of which is connected to the vacuum or servo bellows 35 by the controlled lines 54. The electrical circuitry comprises, in series, the vehicle battery 56, an ignition lock switch 57, a panel switch 59 to disable the belt latch lock holding function, the micro-switch contacts MS–52, and the solenoid 53b of the three-way valve which is then connected back to ground; the holding contacts 53c of the three-way valve being connected in parallel with the micro-switch contacts MS–52.

In the three-way valve 53, when the solenoid is de-energized, the reciprocating valving element 53a connects the controlled line 54 to line 51; but with solenoid 53b energized, blocks the line 51 and the line 54 from each other and from the valve atmospheric vent 53g; and further so that, when in this position, in the event of vacuum failure there is no air leakage possible from 51 or 53g into 54. The valve is arranged so that as the valve element returns under bias from its valve energized or vacuum locking position, it connects line 54 to valve vent 53g briefly but a sufficient time to release vacuum in bellows 35 for unlatching, the action, however, on energization of 53b being so rapid that there is no effective vacuum loss in 51 or 54.

Figure 8:
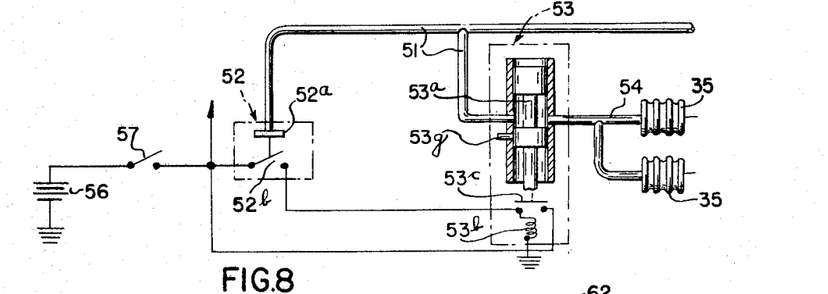
FIG. 8 is a modification of FIG. 7.

Alternately may be used a vacuum switch 52, as in FIG. 8 having normally-open electrical conduits 52b, and also vacuum chamber 52a connected to line 51, of such rating that the normally-open contacts will close under a vacuum attained in the line 51 corresponding to actual vehicle engine operation, on the order of 15 inches of mercury, but the action of 52a must occur after latching by 35 by appropriate choice of 52 and 35, with throttling of vacuum exhaust from 52a if necessary to accommodate such components to each other.

Accordingly, with switch 59 assumed closed, when the switch 57 is closed at the ignition lock, which can be a separate switch or as here shown, for example, the actual ignition switch controlling the ignition line 58, no actuation of the three-way valve occurs by the mere fact of the ignition being on or the switch 57 being closed, until the engine has actually started and developed its proper operating manifold pressure or vacuum communicated to line 51 and valve 53a to operate bellows 35 for unit latching. Thereby the slide is advanced to lock the belt at latch plate 30 in its now operative condition for its proper function as a restraining device for the passenger or driver.

When this occurs, the FIG. 7 contacts MS–52 close energizing the solenoid 53b to close holding contacts 53c at the same time that the three-way valve is set so that the vacuum is now "held" to the bellows or latching motor 35.

The closure of vacuum switch contacts 52b in FIG. 8, after the bellows 35 advance the bolt 31 to locking position similarly energizes the vacuum valve solenoid 53b, closing holding contacts 53c and holding the vacuum in bellows 35.

Under normal driving conditions, with vacuum being maintained and the ignition switch on, the latches are kept engaged by the vacuum held in the respective bellows 35. Should the vacuum switch 52 or micro-switch MS–52 fail, the holding contacts 53c being closed will maintain the solenoid energized and the valve in appropriate condition. In the event the motor should stall in the course of normal driving or should stall upon collision or other accident, though the vacuum then applied to the line 51 will disappear, the valve 53 keeps the control line 54 to the bellows from venting and accordingly preserves the vacuum therein, so that the latch or latches remain engaged. The latches, however, are released either at the end of normal driving or even after a motor stall or accident, upon opening either of the ignition switch 57 or panel switch 59, which immediately de-energizes the solenoid 53b, permitting the valving elements to shift so that the control line 54 is opened to atmosphere in its transit to de-energized position, allowing air to enter the bellows 35 which are biased to move the sliding latch 31 back into disengaged position upon release of vacuum, The normal resiliency of a vacuum type bellows tending to extend it may afford such bias, or a bellows with an internal biasing spring may be used. At that point the doors may be opened even though the seat belts are not unbuckled. In any event once latching has occurred, except by unbuckling the seat belts, the door or doors cannot be opened unless and until the ignition switch 57 has been opened, or with the engine stalled at least 59 off.

The form of control illustrated in FIGS. 7 or 8 may be used not only for the harness-type rigging of FIG. 4 or of FIG. 5 where the bellows of the units 15 and 15A, or 15B are similarly connected to the control vacuum line, or for the arrangement of FIG. 6 with two cooperative door units, but also may be used for a plurality of such ordinary transverse belt type arrangements of FIG. 1 at the various seat positions, the several bellows or servo devices 35 merely being connected to the control line 54.

In the modification of unit 15 shown in FIGS. 9–10 the arrangement is generally similar to that of FIG. 2; but the slide 31 is actuated to latched and unlatched position by the aligned hollow solenoids S–1 and S–2 with armatures joined in alignment with each other for reciprocation parallel to or as here shown in the direction of movement of the latch bolt 31 connected thereto in alignment. Thus upon energization of solenoid S–1, for example, and its armature being drawn inwardly relative to S–1, the bolt is slid to latched position, the outboard end of the armature opening the normally-closed locking solenoid limit switch 61 to de-energize S–1, leaving the bolt in latching position.

When the latch is to be released, solenoid S–2 is energized to draw the bolt towards unlatched condition, the normally-closed unlocking solenoid limit switch 62 being similarly opened by the outboard end of the armature in solenoid S–2 to de-energize the latter.

The control circuitry for such a solenoidally operated latching device further includes the normally-open ignition switch contacts 57 in series between the vehicle battery 56 and coil 64c of the relay 64 having normally-closed contacts 64a and normally-open contacts 64b respectively connected to the battery 56 in series with limit switch 62 and solenoid S–2, and to the controlled side of switch 57 (and thereby to the ungrounded side of the battery) in series with the normally-open limit switch contacts 65b, limit switch 61 and solenoid S–1; the limit switch 65 with contacts 65b being actuated to non-normal setting by entrance of latch plate 30 into proper latchable position.

Assumnig the unit of FIG. 9 to be a door unit, and the ignition off as the door is closed, the contacts 65b are closed by plate 30 at, or coming into, latchable position in the unit. That the plate 30 will be able to come into latched position, without hindrance by the bolt obstructing its forward edge, is assured by the fact that contacts 64a are closed when 57 is open, so that should the latch drift toward the belt between slot and reel, the attendant closing of limit switch 62 energizes S–2 to retract the bolt. Upon closure of ignition switch 57, energizing relay coil 64c, contacts 64a open, to remove latch control from 62, and contacts 64b close. Since switch contacts 65b are closed by plate 30, the closure of 64b energizes solenoid S–1 retracting the armature of the latter to slide the latch bolt 31 into latched engagement with plate 30, and thereupon opening limit switch 61 to de-energize again S–1. Should the latch bolt, therefore the joined aligned armatures tend to drift from the latched position, limit switch 61 would again close before latch disengagement, to momentarily re-energize S–1 and restore the proper full latch engagement.

Here again once the latch is engaged and the belt in use, the associated door of the automobile cannot be opened until the ignition switch is turned off.

FIG. 9 also discloses a further modification inasmuch as it shows not only the solenoidal latching as an alternate to the bellows latching of FIG. 2, but also shows, as an alternate form of belt retracting motor connected to belt reel shaft 23, an electric motor 26A. The latter is a direct current or universal motor, connected in series with normally-closed limit switch contacts 65a between ground and contacts 64b and actuated to non-normal or open condition by entrance of belt latch plate 30 into proper latching position in the reel and latching unit. Accordingly the contacts 65a may conveniently be part of the single latch plate actuated limit switch 65 including contacts 65b. With this arrangement upon closure of the door and turning on ignition switch 57, thereby closing 64b, the motor 26A is energized to reel in the belt until the latch plate enters its proper latchable position; thereupon actuating limit switch 65 to open contacts 65a, de-energizing the motor, and closing 65b to cause latching as previously described.

FIG. 10 shows a further modification in a unit, e.g., for a front hinged door, which by an action similar to that outlined for the ceiling mounted unit and shoulder strap arrangement of FIG. 5 advantageously swings the strap further forward when the unit-supporting door is opened. This may be found particularly useful where the strap or belt is one piece from the latch plate to the opposite side of the seat position, having adjustment to the wearer made, e.g., at the anchor point 12 or other suitable position, with the purpose that the belt or strap not be readily opened to two separate parts between its end connections and thereby generally be left in condition ready for use without buckling. Thus the external strap portion, the body restraining strap reach, is secured to the latch plate 30 by a sturdy hook plate 14d having a broad hook formation engaged in the latch plate end slot, so that the outer strap can, by more deliberate action than involved in releasing an ordinary buckle, be disconnected from the unit.

This modification comprises, as in previously described FIG. 5, the use of a track 42a as a slideway receiving and guiding a pulley type slide device 40a and its extension biasing spring 41a; the spring being stretched as the strap is reeled in by the motor, and upon paying out of the reeled strap portion from the reel tending to contract and pull the strap portion between the slot 21a and device 40a in against the door, with the point of departure of the strap from the door thereby moving toward the front or hinged edge. This then operates to widen the angle between the strap and seat as the door is opened, for clearer entrance and exit, and as well guides the strap into and holds it in neater disposition, after it has been extended manually by opening of the door especially upon door closure without actuation of the reel drive or the unit as a whole.

The track 42a is a simple channel section with the channel leg edges bent inwardly as small lips or flanges defining a broad slot wider than the belt width, these flanges serving to retain the device 40a in the channel as a track, with the strap extending therethrough.

The device 40a comprises an open or hollow rectangular frame 40c, a pair of spaced similar rollers 40d with reduced opposite ends rotatably engaged as journals in aligned apertures of or otherwise rotatably supported in the frame, the diameter of the rollers 40d being intermediate the frame thickness and the channel internal depth, and the spacing of the rollers adapted to pass not only the reelable portion of the strap but also plate 30 received therebetween as represented in FIG. 10. The left roller is effective as the sheave or pulley, the second like roller, however, cooperating therewith to provide symmetrical support for the stops 30b of the latch plate and thereby of the latch plate.

The extension spring 41a has its ends connected respectively to the frame 40c and to a pin 42b secured across the front end of the channel. Where the unit is not mounted with slotted base flush with, but rather offset toward the vehicle interior from, the door inside panel, the channel is gently bent, from its back end region of overlaying attachment on the plane of the base, toward the door panel where its forward end is attached. The disposition of the track may be generally horizontal or inclined, e.g., rising forwardly.

When the unit is unlatched, but the latch plate is in the latchable position of FIG. 10, the force of the spring applied by the left roller substantially at right angles to the rigid plate 30 is ineffective to draw out or unreel the strap. However, once the plate 30 is completely withdrawn from the slot and flexible strap is encountered and deflected forwardly by the left roller, an effective forward pulling force component is then applied in the strap; so that as the door swings open, unreeling the strap, the spring pulls device 40a forward in the track laying the strap portion between the slot and 40a into the track and forwardly advancing the point of strap departure from the door. When the door is closed, the device 40a then moves further forward to take up at least some looseness in the strap.

When the user is in position and the unit is actuated by starting the engine, the control operation is as described relative to FIG. 9 above; and as the reel motor operates drawing in the strap, the device 40a moves rearwardly in the track extending the spring 41a, until the plate 30 is drawn between the rollers thereof and into position for latching which thereupon ensues as described. Bellows latching with FIG. 11 controls is quite as useful for this modification.

In FIG. 11 is shown such combination of bellows latching and an electrical belt retracting motor; the arrangement being generally that of FIGS. 2 and 7 with the electric motor 26a and latch plate actuated limit switch 65 of FIG. 9; here, however, the normally-open contacts 65b being inserted between the three-way valve solenoid or coil 53b and ground so that the latching vacuum cannot be applied to the bellows unless the belt latch plate 30 is properly positioned; the motor-control normally-closed contacts being inserted between the motor 26A and the controlled side of ignition switch 57.

Figure 12:
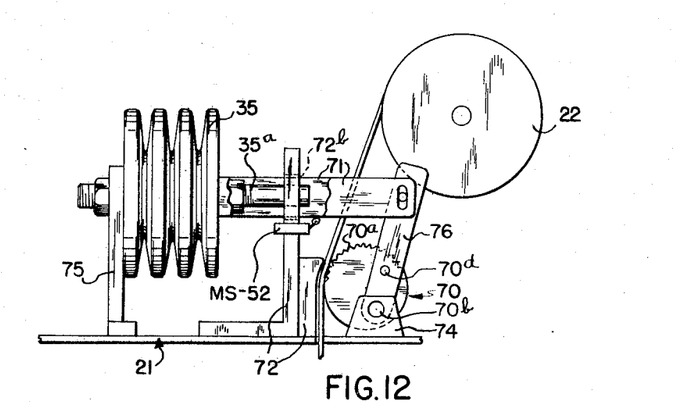
FIG. 12 shows a modification of the strap anchoring means.

An anchoring means variant for the extensible strap portion is shown in FIG. 12, also advantageous where it is desired that a strap detachable at 12 be completely retractable. Therein, instead of a sliding latch bolt engaging in a reinforced aperture in the strap, as provided in effect above by apertured latch plate 30, the strap is gripped against a slightly concave face of a plate 72, secured to the base 21 relative to the slot similar to 32 in FIGS. 2–3, by a longitudinally serrated or grooved portion 70a of a solid cylinder 70 on the other side of the slot, and supported at each end by its eccentric trunnions 70b in sturdy pivot brackets 74 on base 21 to be swung into engagement with the strap either by a sturdy solenoid or, preferably, by bellows motion transmitted with force multiplication through a yoke 71 with yoke arm ends pivotally connected by pin and slot connections to respective lever arms 76 on opposite ends of 70. The lever arms are simply connected to the cylinder 70 by having lower ends apertured to fit over respective trunnions inside of brackets 74 and by eccentric pins 70d or screws through the levers threaded into 70 at the locations 70d spaced from trunnions 70b. When the bellows is inactive a smooth cylindrical part of 70 contacts the strap.

Cylinder 70 is at least as long as the strap width; and plate 72 preferably is wider than the cylinder and has end cutouts 72b in which yoke arms 71 are guided with vertical clearance. The yoke is connected on the bellows end rod 35a slideably supported in plate 72, the opposite bellows end here being fixed to angle plate 75; the microswitch MS–52 being located with its actuating button at a suitable position for closure by yoke 71, lever 76 or 70 when the bellows is operated to strap anchoring position, for example, on the edge of plate 72 adjacent a yoke arm with a switch closing cam elevation.

Figure 13:
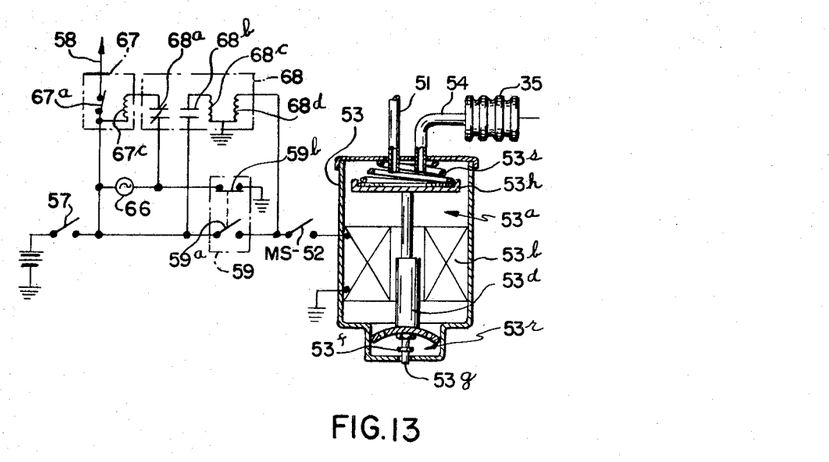
FIG. 13 is a schematic diagram of another circuit and valve.

Here the control system may be that of FIGS. 7, 11 or 13, depending upon the strap retracting means, but with motor retraction of FIG. 11 would require a lug or other irregularity on the strap to actuate the limit switch 65. In any event upon vacuum application, the bellows contracting motion pivots 70 about the eccentrics 70b moving the serrated portion 70a against the strap and carrying the latter against 72 for an effective anchoring. This anchoring engagement becomes only the firmer upon force applied to the strap by the body of the user, due to the increasing radius, from the trunnion axis, of the serrated contact as the strap tends to draw out thereby rotating 70 counter-clockwise in FIG. 12. Upon release of the vacuum, with bellows internal spring bias extending the bellows, element 70 is rotated clockwise, carrying the strap engaging surface away from plate 72 to release the strap, to which only a smooth part of 70 is ultimately adjacent.

A modification of the control circuitry is shown in FIG. 13 wherein similar reference numerals are used for parts corresponding to those of previous figures. The valve 53 without holding contacts has its solenoid 53b connected between the controlled side of microswitch MS–52 and ground, as previously, in series with a manual switch device 59a (for turning the unit on and off) and the ignition switch 57 across the voltage source or battery 56. However, further circuitry is included as hereinafter described to provide an interlock with the ignition system so that the engine may not be started, unless the unit is turned on at the manual panel switch; and also a warning light indicating when the unit is turned off. Though the movable valve member 53a is shown in transit as if under the effect of a solenoid just energized, the control circuitry settings are those prevailing for the engine in off condition with ignition switch and manual switch off.

The valve casing 53 enclosing the solenoid provides a chamber with a top having respective inwardly projecting port formations to which vacuum line 51 and bellows line 54 are externally connected. The chamber (hence lines 51 and 54) is closed to atmosphere at vent 53g when the solenoid-moved valving element 53a is biased to open position by conical spring 53s with the solenoid de-energized; and thereby the lines 51 and 54 are effectively connected to each other so that the vacuum developed upon engine starting actuates the bellows 35 to latch the strap.

The movable valve member 53a here includes an armature 53d, coaxially arranged and guided for movement in the hollow center of solenoid 53b; a head 53h carried on a reduced diameter extension above the armature and adapted upon solenoid energization to move against and seal the port openings for 51 and 54 from the chamber, from each other, and from vent 53g; a reduced bottom end extension adapted as by a rubber or like flange 53f or a tip thereon to seat over or in and to block off the vent 53g from the chamber with the solenoid de-energized and 53a biased to downmost position by spring 53s; and further a return retarding device 53r to slow down the return of the valve member to vent-closing position after solenoid de-energization.

The head 53h is shown having an upward peripheral flange within which is received and located the large bottom turn of the spring 53s as well as a disk of rubber or other elastomer adapted to effect a seal when advanced against the ends of the inwardly projecting port elements for lines 51 and 54. The bottom end of the movable valve member may be loosely pivoted in a central bottom aperture providing vent 53g.

The retarding device may comprise a perforated felt or rubber or elastomeric disk centrally upwardly thickened or centrally supported by a superior flat metal disk, or a perforated downwardly cupped elastomeric element, secured on the bottom extension, for example, by a nut and washer or press-fitted disk holding it against the bottom of the armature enlargement, with its circumference frictionally engaging the inside of a reduced-diameter, cylindrical bottom extension of the valve housing or casing, which aptly may be a capped drawn sheet metal can-like casing, or a capped-molded plastic structure.

With this arrangement as the valve member moves upward under solenoid energization, thereby opening vent 53g and then closing off 51 and 54, the periphery trails or flexes downwardly sliding easily on the surrounding wall with little retarding effect; while upon solenoid de-energization and spring-biased return toward vent closing, the periphery tends to move into tighter wall engagement with consequent retardation. Therefore, though the upward transit or movement may occur in a few hundredths of a second, so that opening of vent 53g is ineffective so to reduce a vacuum being applied from 51 to 54 as to adversely affect belt latching, on the other hand, the spring biased return occurs quite slowly enough for air to enter the vent 53g, pass through perforations in 53r and through the solenoid core center to enter 54 for quick vacuum release at 35, and hence belt unlatching.

Hence, any engine stalling upon collision or other accident present no problems since the vacuum is preserved in the crucial time of and after the event leading to such stalling, in which the safety strap must function. The strap is, of course, immediately unlatched upon turning off the ignition switch 57 or panel switch 59, de-energizing the solenoid to open the valve and thereby admitting air to the bellows.

In FIG. 13 the manual switch 59 is shown as a double switch, the two halves of which are simultaneously operated, by a single toggle lever or button arrangement, so that when either one is off the other is on. When the condition of this double switch is referred to as "off" or "on," if not otherwise specified, the reference is to its setting as to the condition of the switch portion or contacts 59a of primary importance as in previous circuits, since the control point for the user selecting whether the unit 15 will be operable.

In addition to the connection of the valve solenoid 53b in series with ignition switch 57, panel manual switch half 59a and latch microswitch MS–52 in manner similar to FIG. 7, first there is a panel warning light 66 connected in series with the manual switch contacts or switch half 59b, between the controlled side of ignition switch 57 and ground. It is readily seen that at any time when the ignition switch is on, and the manual switch 59 off (i.e., 59a open to disable the belt latching function), the warning light is turned on since 59b is then closed, whether the ignition switch is turned on to start or the engine is already running.

Secondly is included circuitry which requires the strap latching unit to be turned on (i.e., manual switch 59 turned on, closing 59a) at least before the engine can be strated; comprising a relay 67 with normally-closed contacts 67a, interposed between the ignition switch 57 and the controlled ignition line and/or starting line 58, and solenoid 67c connected or connectable in operation between the controlled side of 57 and the manual switch contacts 59b, i.e., in parallel with lamp 66. Thus with manual switch 59 off (59a open, 59b closed), when 57 is turned on for starting, energization of 67c opens 67a so that the engine cannot be started, lamp 66 being also turned on, indicating the cause, namely off condition of 59.

Since, however, a permanent connection of 67c provides a circuit whereby the engine would be turned off if 59 should have to be turned off while the vehicle is operating, the circuit further includes relay 68 with normally-closed contacts 68a in series with the solenoid 67c for disabling 67. This relay 68 has also normally-open contacts 68b and is effect two solenoid windings 68c, 68d whereby the contacts may be both changed from normal to non-normal settings by energization of either winding. Winding 68c is connected in series with normally-open contacts 68b between ground and the controlled side of 57, i.e., before contacts 59a as a holding circuit, and winding 68d from the controlled side of 59a (i.e., a point between 59a and MS-52) to ground.

With this arrangement, if 59 is off, and engine starting is attempted by closing 57, since 59b and 68a are closed relay 67 is energized and held in open condition disabling the starting function, and lighting 66. If manual switch is then turned on, or is already on, so that the strap latching function is on, 59b being open, 67 is consequently in de-energized condition and 67a closed so that the engine can start and the vehicle be operated. Moreover, with 59a closed, the closure of the ignition switch 57 energizes 68d, thereby closing 68b energizing 68c to hold 68b closed and 68a open, so that despite a subsequent setting of manual switch 59 to off position, relay 67 cannot be energized and the engine can continue in operation until the ignition switch 67 is opened. Relay 68 could also include normally-closed contacts in series with winding 68d to disconnect 68d once holding by 68b–68c has been taken over.

It is obvious that the units as hereinabove described may be utilized in various other positions or arrangements. Thus a unit 15 may be located on the floor at or to the rear of the location occupied by 12B in FIG. 5 with the anchor 12B then located in place of 15B: moreover, the unit 15 in FIG. 5 may be replaced by a reversible electric motor rotationally driving a long screw located in track 42, the latter assuming the shape of a downwardly open channel slideably embracing and holding against rotation a travelling nut thus driven longitudinally therein by the screw. Thus with the motor actuated to drive the nut forward, a strap or harness directly anchored at 12B and on the nut as a carriage becomes slack for the user's entrance to and exit from the seat; and with the nut driven rearwardly to stop at say position of 40 in FIG. 5, the harness or strap is tightened into a body restraining disposition; limit switches being used to determine the nut travel, and the motor controlled to drive the nut rearwardly upon ignition and/or panel switch turn-on. Where a fine pitch screw is used, the system itself ensures retention of the strap in rearwardly retracted position, even though the screw be more or less directly driven by the motor through perhaps only a torque-limiting coupling, though a nut-latching or screw locking device might be required where a long pitch screw is used.

In such screw arrangement, whether installed at a ceiling, floor or door location, a unit 15 may be mounted on or connected to the nut, when it is desired to have a belt displaced or displaceable, under conditions appropriate for unlatching, to a greater extent or excursion from the seat location than would be conveniently obtainable with the unit mounted as in FIGS. 1, 4, 5 or 6. On the other hand an entire unit 15, especially with a spring motor retractor, can be secured on rugged carriage in a door mounted track running fore and aft, horizontally or with forwardly upward inclination, being forwardly biased by an extension spring as in FIG. 10, and locked by a manually releasable device at rearmost operating position, so that upon release and door opening the same will be pulled forward carrying the strap to widen the strap angle with the seat.

Obviously various warning or interlock arrangements may be used in addition to those above described; for example, where a separate belt buckle, end anchor, or connection at a unit 15 is involved, by making the separable portions as, or including in them, separable contacts of a warning light system indicating that the belt is not in use, or of an interlock with the ignition system; or a microswitch on one of the separable elements operated when the latter are separated can serve like purpose. Furthermore, similar critical points may be provided with warning light circuitry to indicate a non-operable point in the overall safety rigging system, or with switches, e.g., connected in series with switch contacts 59b, to ensure at least initial use or attention to the seat belt or other safety rigging before starting the vehicle.

Both with one panel switch 59 serving to turn on and off a plurality of safety rigging units at front and back seat positions in a vehicle from one central control point located conveniently to the vehicle operator's seat, and in the case of switches such as 59 incorporated in individual control circuits or sub-circuits for each such unit, such switches are preferably further located for convenient access from the vehicle exterior, so that in the event of a serious accident, through windows smashed if needed, rescuers can easily reach such switches to turn off the latching function, obviously desirable even for units not door-mounted and thereby door-holding, as is likely to be the case, e.g., for some automobile back seat environments.

In the case of a traveling nut type arrangement, either with a strap end secured to the traveling nut directly or mediately through a strap reeling and latching unit of one of the above-described types, it may be found useful, especially where there is no strap length adjustment, to provide the effect of such adjustment by mounting the rear limit switch for adjustable positioning along the track or nut path.

The automatic tightening or latching function of a pair of such units, e.g., in front or rear seats of an automobile may further be utilized to serve a third seat position, that is, a middle seat position to be occupied, for example, by a small child. For such purpose, a third belt may have its ends connected to the inner portions of, but at points spaced from the inner ends of, adjacent belts to the right and left thereof controlled by respective latching units; according to the child's size, the points of connection preferably being adjustable along the respective adjacent belts by any suitable means, of which many are well known, e.g., eyelets through the belting in which hooks on a belt end may be engaged. In this arrangement, when the adjacent belts are unlatched, they may be slackened and so also the third belt for placing or removing the child, but when the adjacent belts are latched after reeling in or tightening, the third belt is thereby held in operable disposition across the middle seat space.

I claim:

1. For a safety strap rigging providing a strap extending over a seat location in an environment particularly such as a vehicle, with opposite strap ends anchored for restraining the body of a person in the seat, a unit for securing at least a strap end anchoring portion in an extensible and retractable manner and anchoring the said portion in a retracted relation comprising:

a base adapted to be securely mounted to the seat environment;

a said strap end anchoring portion running into said unit and extensible from and retractable into said unit;

retracting means to cause said anchoring portion to be retracted from an extended condition into said unit;

anchoring means on the base actuatable to engage and to anchor the said end anchoring portion in the unit in a retracted condition; and control means, responsive to an operating condition of said environment prevailing when said rigging is to be used, to actuate said anchoring means;

said base having a slot for entrance of said end anchoring portion into the unit;
said retracting means comprising
a reel for said strap end anchoring portion rotatably mounted on said base with axis parallel to said slot and
motor means driving said reel for strap retraction and allowing unreeling under tensile force by the user extending the strap when not anchored by the unit;
said anchoring means comprising
a latch plate in the said strap end anchoring portion adapted to enter said slot at required retraction of said strap end anchoring portion, and
latching means on the base engageable with said latch plate to secure it in the base slot.

2. A unit as described in claim 1, wherein said retracting means is a spring motor storing, upon extension of the strap end anchoring portion from the unit, energy for retraction.

3. A unit as described in claim 1, wherein said retracting means is an electric motor, said unit including a motor control limit switch actuated by said latch plate when in latchable position in said slot for shutting off the motor when said strap end anchoring portion is fully retracted.

4. A unit as described in claim 1, wherein
said latching means comprises a moveable latch bolt, normally biased out of a plate-latching position; and
said control means includes a bellows moving said bolt into plate-latching position.

5. A unit as described in claim 1 wherein said latching means comprises
a latch bolt moveable between positions where it latches and unlatches said latch plate; and
double-acting solenoidal means for moving said latch bolt between latching and unlatching positions.

6. A unit as described in claim 1, wherein said retracting means is a spring motor storing, upon extension of the strap end anchoring portion from the unit, energy for retraction; and said latching means comprises a moveable latch bolt, normally biased out of a plate-latching position; and said control means includes a bellows moving said bolt into plate-latching position.

7. A unit as described in claim 1, wherein said retracting means is an electric motor, said unit including a motor control limit switch actuated by said latch plate when in latchable position in said slot for shutting off the motor when said strap end anchoring portion is fully retracted; and said latching means comprises a latch bolt moveable between positions where it latches and unlatches said latch plate; and double-acting solenoidal means for moving said latch bolt between latching and unlatched positions.

8. A unit as described in claim 1, wherein said control means includes
means operated in response to application of electric power from a source of the vehicle;
and in combination with an ignition switch and unit manual control switch in series between said source and said means for application of power thereto;
a vehicle engine ignition power line and said manual switch each connected on the controlled side of the ignition switch;
a second manual switch operated commonly with, but to on or off condition opposite that of, the first control switch;
and an indicator warning light in series with the second said switch between the controlled side of the ignition switch and ground, to light when said ignition switch is on with said unit manual control switch off.

9. A unit as described in claim 1, wherein said control means includes
means operated in response to application of electric power from a source of the vehicle;
and in combination with an ignition switch and unit manual control switch in series between said source and said means for application of power thereto;
a vehicle ignition power line and said manual switch each connected on the controlled side of the ignition switch;
a second manual switch operated commonly with, but to on or off condition opposite that of, the first control switch;
a relay having normally-closed contacts in said ignition power line and its solenoid connectable in series with the second said switch between the controlled side of the ignition switch and ground to open said ignition line and disable vehicle engine operation when said ignition switch is turned on with said manual control switch off.

10. A unit as described in claim 1, wherein said control means includes
means operated in response to application of electric power from a source of the vehicle;
and in combination with an ignition switch and unit manual control switch in series between said source and said means for application of power thereto;
a vehicle engine ignition power line and said manual switch each connected on the controlled side of the ignition switch;
a second manual switch operated commonly with, but to on or off condition opposite that of, the first control switch;
a relay having normally-closed contacts in said ignition power line and its solenoid connectable in series with the second said switch between the controlled side of the ignition switch and ground to open said ignition line and disable vehicle engine operation when said ignition switch is initially turned on with said manual control switch off; and
a second relay having normally-closed contacts connecting said solenoid in series with said second switch, normally-open contacts, and first and second solenoids, each upon energization transferring the contacts of the second relay to non-normal condition, the normally-open contacts and said first solenoid in series between ground and the controlled side of the ignition switch, the second solenoid connected between the controlled side of the first said switch and ground; whereby after initial closing of said ignition switch with the first switch on, the latter may be turned off without disabling vehicle operation.

11. The combination of a vehicle safety strap rigging including a said strap with the unit of claim 1, wherein the seat location is a forwardly facing vehicle seat with front-hinged vehicle doors lateral thereof, said unit being mounted on one of the vehicle doors at a position where said strap may extend roughly horizontally across a person in said seat.

12. The combination of claim 11 including means anchoring the other strap end to the other said door.

13. The combination of claim 12 wherein the last said means is a second said unit mounted on the other said door.

14. The combination of claim 11,
wherein said retracting means comprises an electric motor, said unit including a motor control limit switch actuated by said latch plate when in latchable position in said slot for shutting off the said motor when said strap end anchoring portion is fully retracted to a plate latchable position;
and further including a pulley-like device having the strap passed therethrough and an extension spring having ends secured respectively to said device and to the forward hinged edge region of said door.

15. The combination of claim 14, wherein there is provided a track channel open toward the seat extending forwardly from the slot on the seatward side of the base to a point of attachment of the door proximate to the hinged door edge, and said pulley-like device is slideably engaged and guided in said channel for movement longitudinal of the channel and has the strap passing therethrough forward of a roller of the device mounted with axis parallel to said slot; said extension spring has its forward end secured to the forward terminal region of said track.

16. The combination of a vehicle safety strap rigging including a said strap with the unit of claim 1, wherein said unit is mounted above and to the rear of said seat location, at a position from which said strap may extend over at least a shoulder-chest region of a person therein.

17. The combination of claim 16 wherein the other end portion of said strap is anchored on a belt type strap extending across a person in said seat.

18. The combination of claim 16 wherein the other end portion of said strap is anchored to a vehicle portion at a location between normal feet positions of a person in said seat.

19. The combination of claim 18 including a forwardly biased strap supporting sheave shiftable in the vehicle region above said seat location from a position immediately adjacent said unit to a position forward of said seat location.

20. For a safety strap rigging providing a strap extending over a seat location in an environment particularly such as a vehicle, with opposite strap ends anchored for restraining the body of a person in the seat, a unit for securing at least a strap end anchoring portion in an extensible and retractable manner and anchoring the said portion in a retracted relation comprising:
  a base adapted to be securely mounted to the seat environment;
  a said strap end anchoring portion running into said unit and extensible from and retractable into said unit;
  retracting means to cause said end anchoring portion to be retracted from an extended condition into said unit;
  anchoring means on the base actuatable to engage and to anchor the said end anchoring portion in the unit in a retracted condition; and
  control means, responsive to an operating condition of said environment prevailing when said rigging is to be used, to actuate said anchoring means;
  said base having a slot for entrance of said end anchoring portion into the unit;
  said anchoring means comprising
    a latch plate in the said strap end anchoring portion adapted to enter said slot and provide a stop for said strap end anchoring portion at required retraction of said end anchoring portion, and a latching bolt on the base engageable with said latch plate to secure it in said slot and normally biased to disengage said latch plate;
  said control means including
    a vacuum bellows moving said bolt into latching engagement, a vacuum line connection from said bellows to the combustion engine intake manifold of a vehicle as the environment of said unit, whereby vehicle engine operation establishes a condition to actuate said anchoring means.

21. A unit as described in claim 20 wherein said control means further includes a solenoidally operated valve in said vacuum connection, adapted to open said bellows to said intake manifold for latch actuating vacuum application to said bellows, to open said bellows to an atmospheric vent for disengagement of the strap end anchoring portion from said anchoring means, and to block said bellows from atmosphere and said connection to preserve vacuum in said bellows and thereby said anchoring means in an actuated strap anchoring condition.

22. A unit as described in claim 21 wherein said control means further includes an electric control circuit comprising: a series circuit including an electrical energy source, primary control switch means, a solenoid for operating said valve to blocking condition, and a switch closable only after attainment of a vacuum effective to actuate said anchoring means; and solenoid holding contacts in parallel with the last said switch, whereby after energization of said solenoid by closure of the primary control switch means and of said switch to anchor the strap end anchoring portion, said strap end anchoring portion remains anchored in the unit until opening of said primary switch means, thereby to release said valve for bellows venting.

23. The unit as described in claim 22, wherein the last said switch comprises a bolt-actuated switch closed upon vacuum application in said bellow moving said latch bolt into strap latching position.

24. The unit as described in claim 22, wherein the last said switch comprises a vacuum switch connected to the intake manifold.

25. The unit as described in claim 22 wherein said primary switch means comprises a switch actuated to closed condition by a vehicle ignition switch lock.

26. The unit as described in claim 23 including a normally open switch closed by said latch plate entering said slot into latchable position, and connected in said series branch.

27. For a safety strap rigging providing a strap extending over a seat location in an environment particularly such as a vehicle, with opposite strap ends anchored for restraining the body of a person in the seat, a unit for securing at least a corresponding end portion of said strap in an extensible and retractable manner and anchoring said strap end portion in a retracted relation comprising:
  a base adapted to be securely mounted to the seat environment;
    said base having a slot for entrance of said end portion into the unit;
  said end portion of said strap running into said seat and extensible from and retractable into said unit;
  retracting means to cause said strap end portion to be retracted from an extended condition into said unit;
  anchoring means on the base actuatable to engage and to anchor the said end portion in the unit in a retracted condition, said anchoring means comprising
    a strap-backing abutment on the base along one side of and extending away from said slot, and
    an element pivoted on the base at the other side of the slot having a free edge engageable with said strap opposite said abutment at a position spaced from said slot whereby with the said element engaging said strap, tension tending to pull said strap out through the slot effects an increasing strap-gripping action between said abutment and elements;
  and control means, responsive to an operating condition of said environment prevailing when said rigging is to be used, to pivotally actuate said element from a non-gripping to gripping position.

28. A unit as described in claim 27 wherein said control means comprises a biasing spring-expanded, vacuum-contractable bellows connected to said base and said element, for bringing said element into engagement with said strap opposite said abutment.

29. A unit as described in claim 27, wherein said element comprises an eccentrically trunnioned generally cylindrical body having longitudinal grooves distal from the trunnion locations to provide a plurality of strap engaging free-edges.

30. For a safety strap rigging providing a strap reach extending over a forwardly facing seat location in an automotive vehicle, with opposite reach ends anchored for strap disposition across and restraining the body of a person in the seat, a unit for securing at least one strap reach end to the seat environment in an extensible and retractable manner and anchoring the said one end to the vehicle in a retracted body-restraining relation comprising:
- a base securely mounted at one side of the seat on a vehicle door, hinged at a location forward of the seat for outwardly opening swing, and having
   - an elongated track extending forwardly toward the door hinge and defining a slideway and a slot for entrance of said flexible means into the unit, with a slide in said track having the flexible means passing therethrough to be guided into said slot;
- flexible means terminating said one end, running into said unit and extensible from and retractable into said unit;
- retracting means to cause said flexible means to be retracted from an extended condition into said unit and comprising
   - a reel for said flexible means rotatably mounted in said base with axis transverse to said slot and motor means driving said reel for strap retraction of said flexible means and thereby of said strap reach and allowing unreeling under tensile force developed by the user displacing the strap reach when said anchoring means is non-actuated;
- anchoring means on the base actuatable to engage and to anchore the said flexible means in the unit in a retracted condition and thereby maintain said reach in body-restraining relation,
   - said anchoring means comprising a latch element located on said base behind and adjacent the rear end of said track and movable into and out of engagement with a cooperating latchable element on said flexible means; and
- control means responsive to an operating condition of said environment prevailing when said rigging is to be used, to actuate said anchoring means,
   - said control means comprising a latch moving motor means normally biased to unlatched condition and moving said latch to engaged position upon starting operation of the vehicle engine.

References Cited

UNITED STATES PATENTS

| | | | |
|---|---|---|---|
| 2,852,270 | 9/1958 | Hunt | 280—150 |
| 2,855,028 | 10/1958 | Matthews | 280—150 |
| 2,937,882 | 5/1960 | Oppenheim | 280—150 |
| 3,061,331 | 10/1962 | Lantis | 280—150 |
| 3,172,700 | 3/1965 | Haas | 297—388 |
| 3,182,923 | 5/1965 | Botar | 280—150 |
| 3,190,694 | 6/1965 | Isaac | 297—388 |
| 3,236,540 | 2/1966 | Berton et al. | 280—150 |
| 3,240,510 | 3/1966 | Spouge | 180—82 |
| 3,266,842 | 8/1966 | Board et al. | 180—82 |
| 3,308,902 | 3/1967 | Carter | 180—82 |
| 3,411,602 | 11/1968 | Royce | 180—82 |

KENNETH H. BETTS, Primary Examiner

U.S. Cl. X.R.

280—150; 297—388

PO-1050
(5/69)

UNITED STATES PATENT OFFICE
CERTIFICATE OF CORRECTION

Patent No. 3,506,083                    Dated April 14, 1970

Inventor(s) Irlin Botnick, Philip D. Golrick & Lewis H. Polster

It is certified that error appears in the above-identified patent and that said Letters Patent are hereby corrected as shown below:

Column 5, line 38, for "conduits" read --contacts--.

Column 6, line 15, for "vacuum," read --vacuum.--.

Column 10, line 5, for "pivoted" read --piloted--.

In the drawings, in FIGS. 1, 4, 5 and 6, the reference legend --ST-- should be applied to the represented sutomobile seat, and for the uppermost "11" and "14" (on the upper belt) read --14-- and --11-- respectively.

FIG. 6, left half, for "D", "14" and "15" respectively read --D'--, --14'-- and --15'--.

SIGNED AND
SEALED
SEP 22 1970

(SEAL)
Attest:

Edward M. Fletcher, Jr.
Attesting Officer

WILLIAM E. SCHUYLER, JR.
Commissioner of Patents